United States Patent

[11] 3,540,753

| [72] | Inventor | Derrick S. Hanson<br>6442 Bartholf Ave., Jacksonville, Florida 32210 |
|---|---|---|
| [21] | Appl. No. | 794,109 |
| [22] | Filed | Jan. 27, 1969 |
| [45] | Patented | Nov. 17, 1970 |

[54] HAND TRUCK
20 Claims, 7 Drawing Figs.

[52] U.S. Cl............................................ 280/47.34, 254/3
[51] Int. Cl....................................... B62b 11/00
[50] Field of Search.................................. 280/47.2, 47.27, 47.28, 47.29, 47.34; 214/148; 254/3

[56] References Cited
UNITED STATES PATENTS

| 993,265 | 5/1911 | McCoy | 280/47.22 |
| 1,913,295 | 6/1933 | Schreck | 280/47.2 |
| 2,361,674 | 10/1944 | Zeindler | 280/47.2 |
| 2,598,168 | 5/1952 | Hooz | 280/47.2 |

Primary Examiner—Leo Friaglia
Assistant Examiner—Robert R. Song
Attorneys—George H. Baldwin and Arthur G. Yeager

ABSTRACT: A hand truck including a generally horizontal and wheeled base assembly movable over a surface area, a framework assembly attached to the base assembly and extending upward therefrom, a generally upright receiving rack having a supporting lip positioned adjacent its lower end portion, and a connecting member having forward and rearward end portions. The forward end portion of the connecting member being pivotally attached to the rack adjacent the lower end portion with the general plane of said rack extending laterally of the normal rolling movement of the base assembly and the rearward end portion being pivotally attached to the base assembly. The truck further includes lifting means extending between and attached to the framework assembly and the forward end portion of the connecting member whereby the rack may be raised and lowered. The rack is pivotable from a rearward transporting position in contact with the framework assembly to a forward loading and unloading position in which the lip is generally parallel and closely adjacent to the surface area.

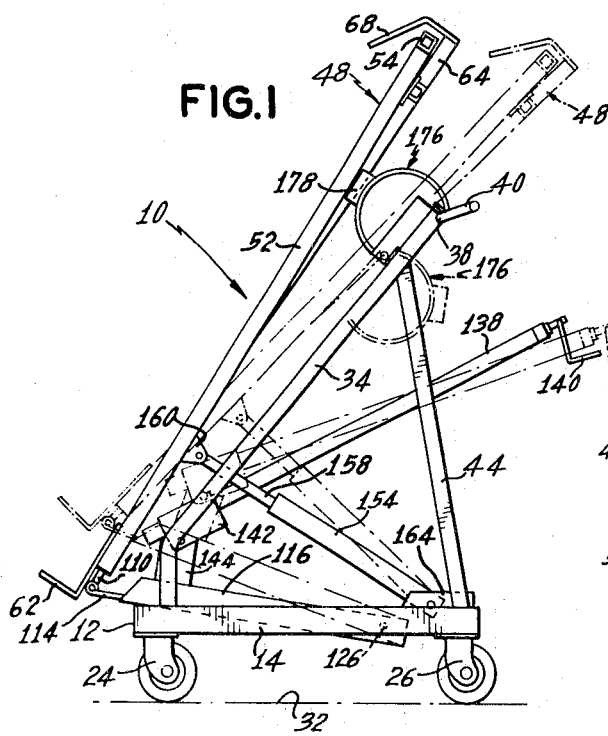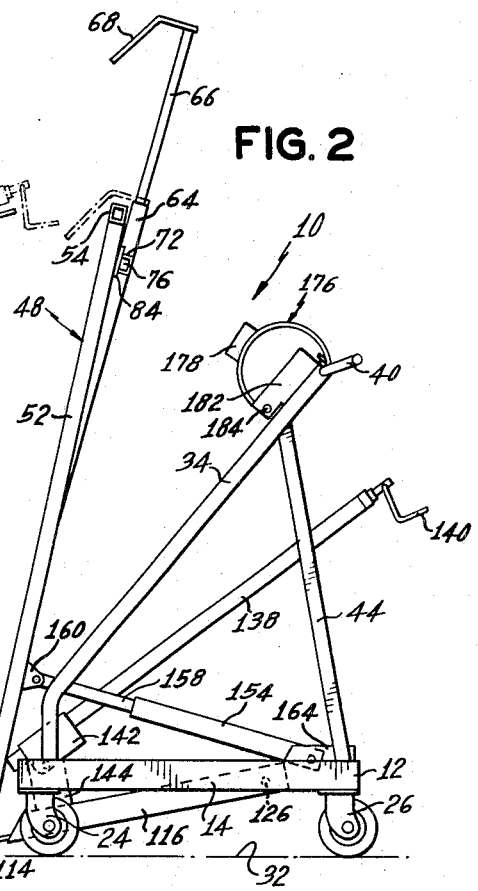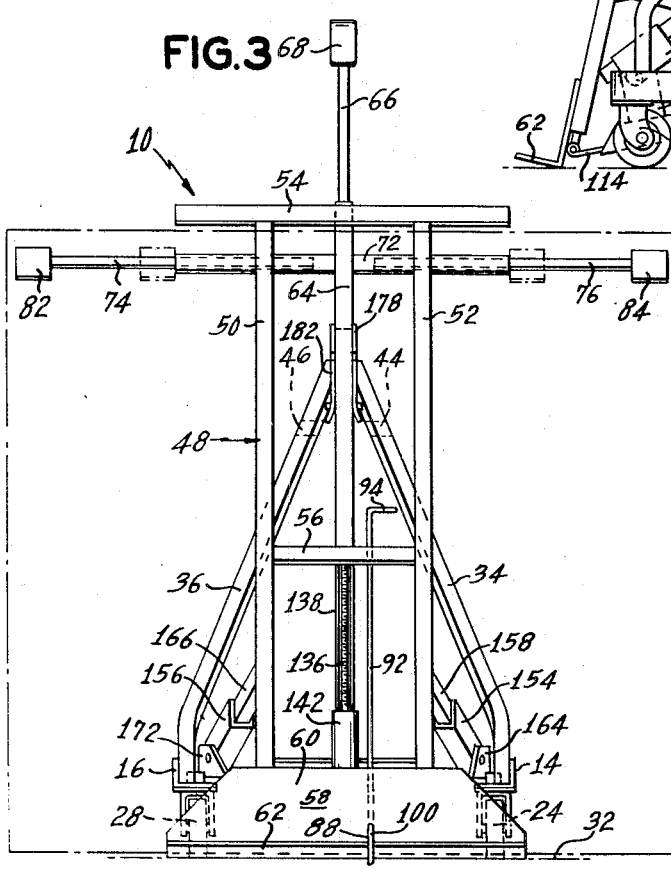

Patented Nov. 17, 1970
3,540,753
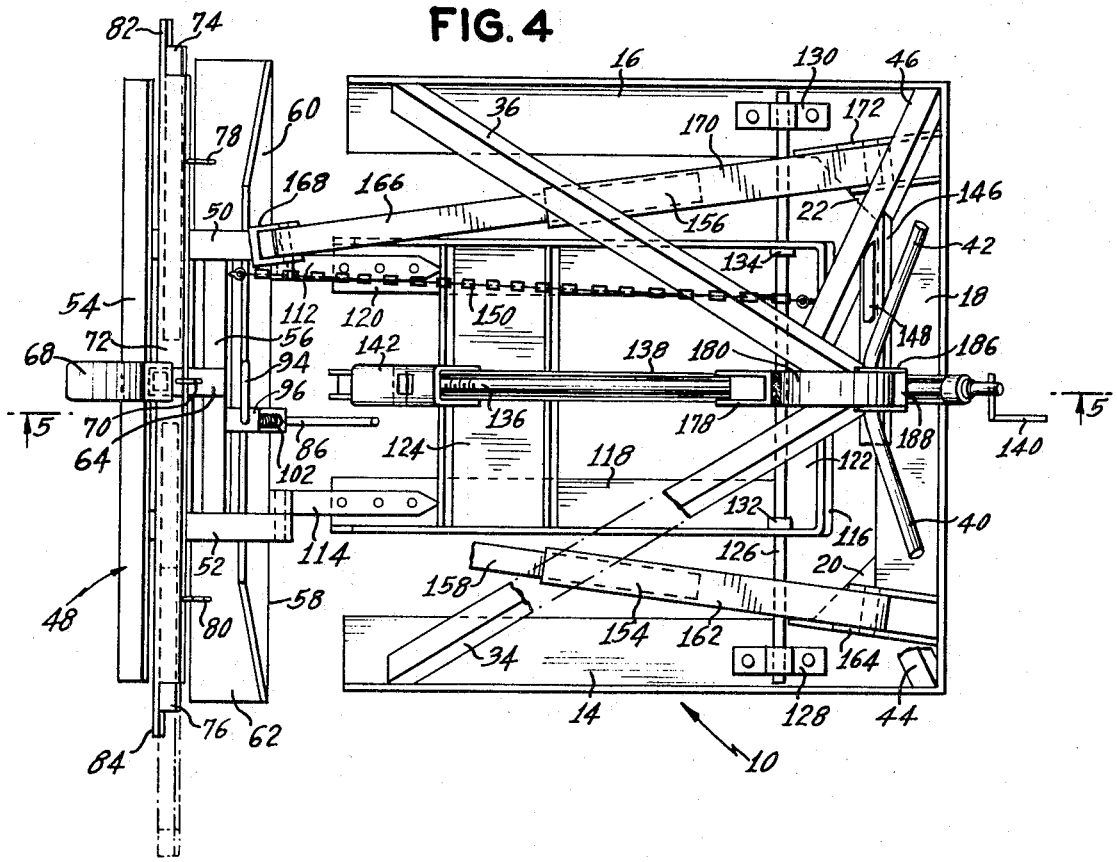
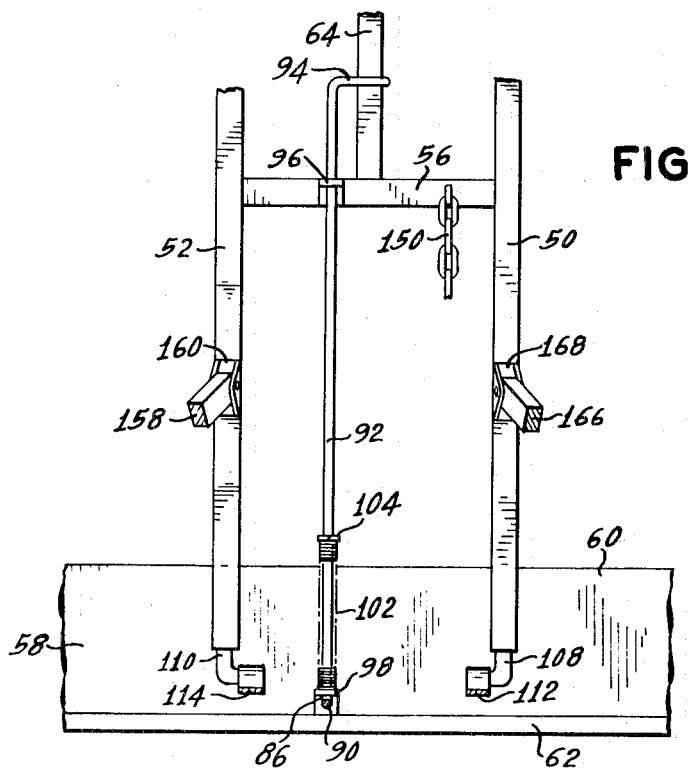
INVENTOR.
Derrick S. Hanson
BY
George H. Baldwin
ATTORNEY Patented Nov. 17, 1970
3,540,753
Sheet 3 of 3
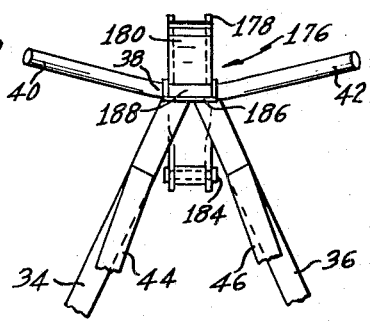
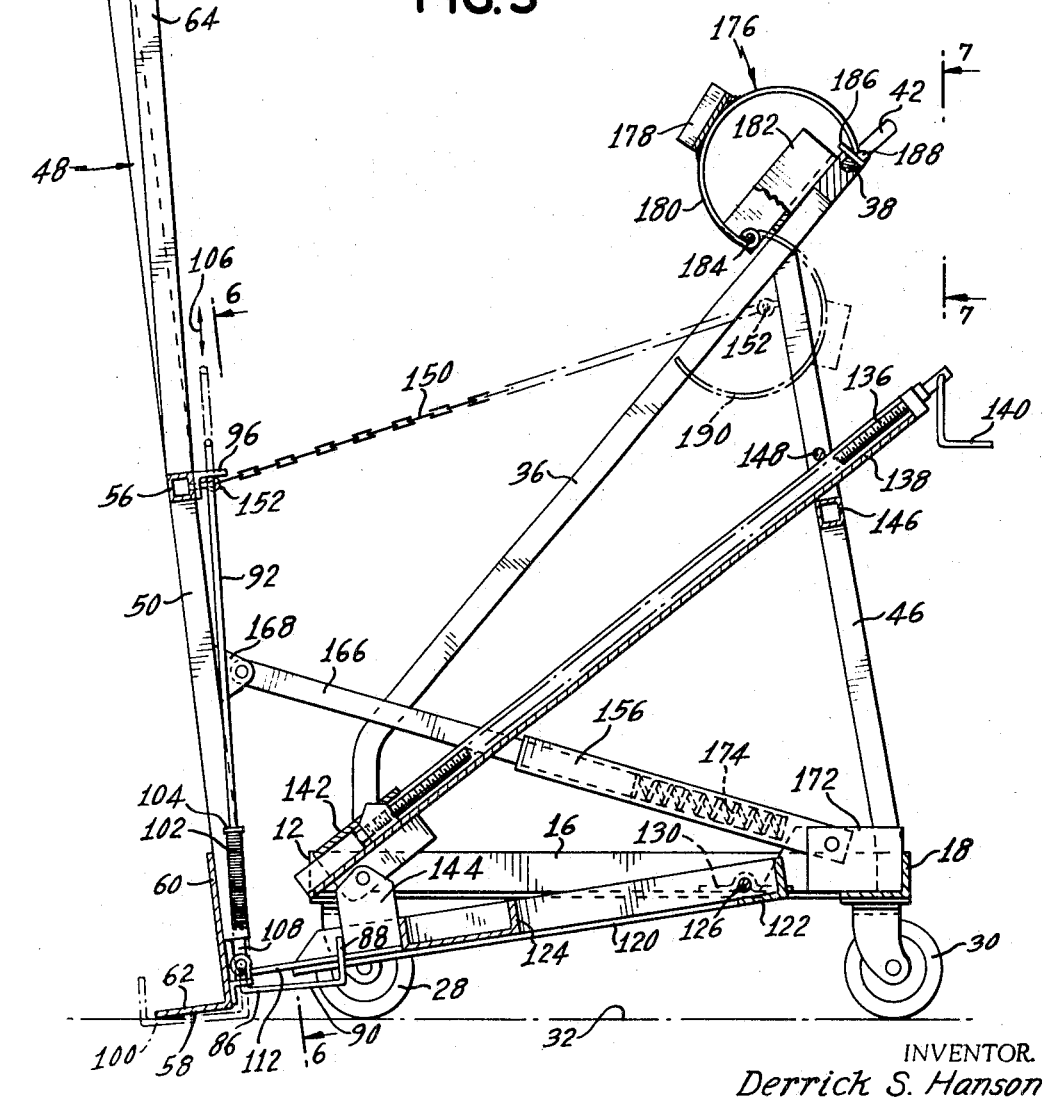
INVENTOR.
Derrick S. Hanson
BY
George H. Baldwin
ATTORNEY 3,540,753

1

HAND TRUCK

BACKGROUND OF THE INVENTION

1. Field Of The Invention

The invention disclosed herein relates generally to improved apparatus for lifting, raising, transferring, moving about, transporting, lowering, positioning, storing and the like of flat materials of relatively large surface area, especially building and construction materials. More particularly, the invention pertains to an improved hand truck or dolly especially adapted for moving or transporting, with a minimum of effort and maximum stability from one place or position to another, flat rectangular objects of relatively large length and width and relatively small thickness, such as plasterboard, wallboard, building board, Masonite, Formica, plate glass, plywood paneling and the like, either in single sheets or in bundles or stacks thereof and that are too heavy or awkward for one or more men to handle with convenience.

In the moving or transporting of building or construction materials, such as set forth hereinabove, it is often necessary to utilize at least two men if not more in the handling of the same. This is due primarily to the fact that such building and construction materials are of such large dimensions, as for example, 4 by 8, 4 by 12 and 4 by 16 feet, that it is difficult for one man to handle these sheets of materials without damaging the same. There is therefore a need for an improved apparatus or device which will make it possible for one man to accomplish the moving about, transferring, positioning, storing and the like of such building and construction materials.

2. Description of the Prior Art

Hand trucks and lifting dollies for raising and transporting relatively flat materials of large surface area have been previously devised, such prior art devices being generally disclosed in U.S. Pat. Nos. 2,939,590, 3,178,038, 3,305,219, 3,306,624 and 3,335,883. Applicant's invention of an improved dolly or lift truck, disclosed herein is an improvement over such prior devices, as shown for example in the above mentioned patents.

SUMMARY OF THE INVENTION

Therefore it is a general object of the present invention to provide an improved apparatus or device for handling, moving about, transporting, transferring, positioning, and storing of building or construction materials such as wallboard, ceilingboard, Formica, plywood paneling, plate glass, Masonite and the like either in individual sheets or in bundles or stacks thereof which can be readily operated and controlled by one man.

Another general object of this invention is to provide an improved hand operated lift truck or dolly especially designed and adapted for picking up, moving about, transferring, transporting and then depositing in a generally upright position building and construction materials which are generally in sheet form and of a relatively large surface area.

A further general object of the invention is to provide an improved device for lifting, transporting, carrying about and then lowering flat rectangular objects of relatively large length and width and relatively small thickness either in single sheets or in bundles or stacks thereof which is operable by a single person.

Yet another object of the subject invention is to provide an improved hand operated lift truck or dolly adapted for engaging an elongated item or several elongated items in a stack on one edge thereof on the dolly and lifting the same above the floor surface on which it is resting for transportation of the item or items on the dolly to another location and then returning the item or stack thereof to rest on one edge thereof on the floor or surface from which they had previously been lifted.

In general these objects are attained by providing a hand truck including a generally horizontal wheeled base assembly generally movable over a surface area, a framework assembly attached to the base assembly and extending upward from, a generally upright receiving rack including a supporting lip positioned adjacent its lower end portion and extending generally perpendicular to the general plane of the rack. The truck further includes connecting means pivotally attaching the rack to one of the assemblies with the general plane of the rack extending laterally of the normal rolling movement of the base assembly. The rack is pivotable on the connecting means from a rearward transporting position in contact with the framework assembly to a forward loading and unloading position in which the lip thereof is generally parallel and closely adjacent surface area.

BRIEF DESCRIPTION OF THE DRAWINGS

The novel features which are believed to be characteristic of this invention are set forth with particularity in the appended claims. The invention itself, however, both as to its organization and method of operation may best be understood by reference to the following description taken in connection with the accompanying drawings, in which:

FIG. 1 is a side elevational view of the improved hand truck of this invention showing the rack for carrying goods thereon in a raised and backward tilted position;

FIG. 2 is another side elevational view of the truck showing the rack for carrying goods thereon in a lowered and forward tilted position;

FIG. 3 is a front elevational view of the truck as depicted in FIG. 2;

FIG. 4 is an enlarged top plan view of the truck of this invention with the rack for carrying goods thereon depicted in its forwardmost tilted position;

FIG. 5 is a cross-sectional view taken along line 5-5 of FIG. 4;

FIG. 6 is a transverse sectional view taken along line 6-6 of FIG. 5; and

FIG. 7 is a transverse sectional view taken along line 7-7 of FIG. 5.

DETAILED DESCRIPTION OF THE PREFERRED EMBODIMENT

Referring to the drawings in detail, and in particular to FIGS. 1, 2, 3 and 4 thereof, the improved dolly or hand lift truck 10 of this invention is seen to include a three sided support base or platform 12 including a pair of elongated side angle members 14 and 16 which are connected at their rearward ends to the opposite ends of an elongated rear angle member 18. Angle members 14, 16 and 18 are braced by members 20 and 22 at their points of adjoinment to lend strength and rigidity to base assembly 12. Each of the corners of support base 12 is provided with a caster, as at 24, 26, 28 and 30, to permit dolly or truck 10 to roll along the surface or floor 32 and to pivot or swivel thereon.

Attached to support base 12 of dolly 10 is a pair of upwardly and inwardly inclined angle members 34 and 36 whose lower ends are respectively attached to the forward end portions of base members 14 and 16. The upper end portions of angle members 34 and 36 meet and are joined together upwardly above the mid portion of rear base member 18. A handle 38 similar to a bicycle handle bar and including an elongated left-hand portion 40 and an elongated right-hand portion 42 is attached to the upper end portions of inclined upright angle members 34 and 36 to afford means by which the dolly may be readily pushed or pulled and by which its turning and angular movements on floor or support 32 may be controlled. Dolly or truck 10 is further provided with a second pair of generally upright inclined angle members 44 and 46, whose lower end portions are respectively connected to the rearward end portions of side angle members 14 and 16. The upper end portion of angle member 44 is attached to the upper end portion of angle member 34, and the upper end portion of angle member 46 is joined to the upper end portion of angle member 36, such as to generally complete the upright and rigid framework assembly to which handle 38 is attached, and on which the rack which carries goods may rest.

With particular reference to FIGS. 3, 4 and 5, dolly or truck 10 further includes a rack 48 on which the goods or materials which are to be transferred and moved about by the dolly may be received. Rack 48 includes a pair of elongated parallel and generally upright members 50 and 52 extending from the top thereof to closely adjacent the bottom of the rack. A support member or bar 54, extends across the top of upright members 50 and 52 and outward beyond the sides thereof to provide a top for the rack and upper supporting member for the goods and materials placed on rack 48. A second generally horizontal support member or bar 56 is positioned between and connected to generally upright members 50 and 52 at a point midway between the upper and lower ends of support rack 48 to lend strength and rigidity to the support rack. The lower end portions of upright members 50 and 52 are attached to an L-shaped material and goods receiver or catcher, which includes a generally upright portion 60 and a generally horizontal portion or lip 62 extending outward and generally perpendicular to upright portion 60. The connection of support members 50 and 52 to receiver 58 is actually to the generally upright portion 60 thereof. Rack 48 further includes a third generally upright member 64 positioned midway between members 50 and 52 and connected to generally horizontal member 56 and extends upward therefrom to slightly above upper generally horizontal member 54. Member 64 is hollow and has positioned within its upper end portion a small extension member 66 of the same cross-sectional configuration such as to slide upward and downward within the hollow of member 64 from a fully extended position as depicted in FIG. 2 to a fully retracted position as depicted in FIG. 5. The upper end of extension member 66 is connected to a downwardly sloping fingerlike hook or catch 68 to engage over the upper edge of materials or goods placed on rack 48 to and in maintaining the same thereon. The positioning of extension member 66 and attached hook 68 is fixable and lockable by means of an adjustable thumb screw 70 positioned within and through upright member 64 such as to engage extension member 66. A further generally horizontal bar member 72 extends between generally upright members 50 and 52, is connected to the back sides thereof and is further connected to generally upright member 64 and positioned adjacently downward of generally horizontal top member 54. Member 72 extends outward to the ends of uppermost member 54 and is provided with a pair of extension members 74 and 76 at each of its opposite end portions. Extensions 74 and 76 have the same general cross-sectional configuration as member 72, but are of a slightly smaller dimension such that these extension members may slide within member 72 from a fully extended position as depicted in FIG. 3 to a fully retracted position as depicted in FIG. 4. The locking of extension members 74 and 76 is respectively controlled by a pair of adjustable thumb screws 78 and 80 mounted within and through respective outer end portions of member 72 such as to make contact with respective extension members 74 and 76 to fix the positioning thereof. Extension members 74 and 76 are provided with respective receiving pads or stops 82 and 84 for receiving and cushioning the outer ends of a long load of goods or materials, as depicted in dashed line configuration in FIG. 3, on receiving rack 48.

Receiving and supporting rack 48 further includes a fingerlike catch or hook 86 which is adopted to aid in retaining the load of goods or materials upon L-shaped receiving member 58 of rack 48. Catch or hook 86 includes a short generally upright forward end portion 88, a lower generally horizontal portion 90 of a dimensional length slightly greater than lip 62, an elongated generally upright extension or operating portion 92, and an upper generally horizontal portion or operating handle 94, see in particular FIGS. 5 and 6. Fingerlike hook or catch 86 is attached to rack 48 by means of a pair of L-shaped brackets 96 and 98, which are respectively attached to generally horizontal reinforcing member 56 and upright portion 60 of L-shaped receiving member or support 58. Hook 86, and in particular portions 88 and 90 thereof, is pivotable by means of operating handle 94, from its inoperative position generally behind support rack 48 to its operative position 100, depicted in dashed-lined configuration in FIG. 5, with portion 88 thereof being positioned in front of and extending upward from lip 62 and with portion 90 extending beneath and closely adjacent lip 62 of receiving and supporting member 58. Hook or catch 86 is provided with a compression spring 102 positioned about upright portion 92 thereof between lower support member 98 and a spring stop 104 fixedly connected to upright portion 92 adjacently above attaching bracket 98 to maintain spring 102 in a compressed state. Hook or catch member 86 is movable upward and downward in the directions of double-headed arrow 106, compression spring 102 urging hook member 86 into its uppermost position to prevent the same from dragging on the floor or interfering with the equipment when it is in its inoperative position (depicted in FIGS. 4, 5 and 6), and maintaining portion 90 thereof closely adjacent the underside of lip 62 such that that portion 88 rises above lip 62 when hook member 86 is in its operative position, as depicted in dashed lines in FIG. 5.

Attached to the lower ends of respective upright support members 50 and 52 is a pair of rounded L-shaped connecting members 108 and 110 having their generally upright legs respectively attached to members 50 and 52. The generally horizontal legs of L-shaped connecting members 108 and 110 are respectively pivotally attached through and to the looped end portions of a pair of straplike connecting members 112 and 114 by which rack 48 is pivotally connected to the forward end portion of an inner three-sided support or member 116 centrally disposed within outer three-sided base 12 of dolly 10. The inner end portions of connecting strap member 112 and 114 are secured by appropriate means, such as bolts or rivets, to the outer end portion of inner support member 116. Three-sided inner support member 116 includes a pair of elongated side angle members 118 and 120 and an elongated rearward angle member 122 extending between side members 118 and 120 and connected at its opposite ends to the rearward end portions of these side members. Inner support member 116 further includes a reinforcing channel member 124 extending between and attached to elongated side members 118 and 120 adjacent their forward end portions. Inner support member 116 is pivotally attached adjacent its rearward end portion to the outer support framework or base 12 by means of a circular rod 126 extending through side members 118, 120 of inner support 116 and having its opposite end portions secured to elongated side members 14, 16 of outer support or base 12 by means of respective strap members 128 and 130, whereby inner support 116 and attached rack 48 may pivot upward and downward about rod 126. Inner support 116 is maintained in a central position between the elongated sides of outer base 12 by means of stop members 132 and 134 appropriately positioned on and secured to rod 126.

Dolly 10 further includes an elongated screw member 136 and a screw encasement sleeve or housing 138 for raising and lowering inner support member 116 and attached rack 48 from their lowermost positions as depicted in FIGS. 2 and 5 to positions upward therefrom as depicted in FIG. 1 for the ready transportation and moving about of goods and materials positioned on rack 48 of dolly 10. Upper end portion of screw member 136 is provided with a handle 140 for turning or operating screw member 136. The lower end portion of screw member 136 is positioned through and secured within mounting block 142 which is pivotally attached to a mounting bracket 144 further connected to the forward portion of reinforcing channel member 124. By turning handle 140 and rotating screw member 136 within housing 138, mounting block 142, and particularly the nut member contained therein and in threaded engagement with screw member 136, moves upward and downward on screw member 136 and along housing 138, thereby raising and lowering the forward end portion of inner support member 116 and rack 48 attached thereto, with the rearward end portion of inner support member 116 pivoting about rod 126. The rearward end portion of screw mechanism 136, 138 is maintained between generally horizontal box member or support 146 extending between upright and inclined members 44 and 46 and generally horizontal retaining rod 148 extending between and attached to support legs 44 and 46.

A link chain 150 is provided extending between and attached by means of screw eyes 152 to generally horizontal brace member 56 of rack 48 and inclined upright leg 46 of the truck framework assembly. Chain 150 limits the forward pivoting movement of rack 48 from the dolly base and framework to the position as depicted in FIG. 5. Support rack 48 is further connected to dolly base 12 by a pair of telescoping side arms or guides 154 and 156. Telescoping side arm 154 includes an inner member 158 having its outer end portion pivotally attached by bracket arrangement 160 to generally upright member 52 of rack 48 and an outer member 162 having its rearward end portion pivotally attached to dolly base 12 by means of bracket arrangement 164. Telescoping side arm or guide 156 includes an inner portion 166 whose outer end portion is attached by means of bracket arrangement 168 to generally upright member 50 of rack 48 and an outer member 170 whose rearward end portion is attached to dolly base 12 by means of bracket arrangement 172. Telescoping guides 154 and 156 are spring-loaded internally thereof by means of a suitable compressable spring, as spring 174 depicted in FIG. 5, to aid in distributing the weight of the load carried on rack 48 to the rearward wheels 26 and 30 of the dolly. Side arms or guides 154 and 156 further act as shock absorbing means to cushion and absorb the shock of the loaded rack 48 on the generally upright pyramidal shaped framework assembly when tilting the loaded rack into its rearward transporting position in contact with the framework assembly.

With particular reference to FIGS. 5 and 7, dolly 10 further includes an adjustable support cradle or stop arrangement 176 on which tilting rack 48 rests when the same is in the position in which goods, materials and the like are to be transported or moved about by the dolly as depicted in FIG. 1. Adjustable cradle or rest 176 includes an upper channel member 178 adapted and arranged to receive and support tilting rack 48 and in particular generally upright member 64 thereof when rack 48 is tilted backwards such as to rest thereon with member 64 being positioned therein as depicted in solid line configuration in FIG. 1. Channel member 178 is connected to a substantially rigid arclike or semicircular strap member 180 which is attached to the lower or forward end portion of a second and lower channel member 182 by means of a pin at the lower or inner end portion of both members 180 and 182. The other or upper end portion of strap member 180 rests and abuts against a stop plate 186 attached to handle 38 and in particular a generally horizontal bead 188 on stop plate 186 to prevent further downward movement of this upper end portion of strap 180. Upon pivoting of strap member 180 and attached channel member 178 forward and downward into its inoperative dashed line position 190 (see FIGS. 1 and 5) rack 48 can be tilted farther backward or to the rear to rest on channel member 182 with generally upright member 64 thereof being positioned within channel member 182. By using this means (adjustable cradle or stop 176), the inclined position of rack 48 can be varied such as to properly and readily distribute the load carried thereby more evenly over the four wheels or casters 24 through 30 of dolly 10.

While only a certain preferred embodiment of this invention has been shown and described by way of illustration, many modifications will occur to those skilled in the art and it is intended that all such modifications be included within the true spirit and scope of this invention.

I claim:

1. In a hand truck comprising a generally horizontal and wheeled base assembly having forward and rearward end portions and being generally movable over a surface area, a framework assembly having forward and rearward end portions attached to said base assembly and extending upward therefrom, a generally upright, elongated, and load bearing rack having upper and lower end portions and including a supporting lip affixedly positioned adjacent its lower end portion, said lip extending generally perpendicular to the general plane of said rack, and connecting means pivotally attaching said rack to one said assembly spaced rearwardly of its said forward end portion with the general plane of said rack extending laterally of the normal rolling movement of said base assembly, said rack being pivotal on said connecting means from a rearward transporting position in contact with said framework assembly to a forward loading and unloading position in which the lip is generally parallel and closely adjacent to the surface area.

2. In the hand truck as defined in claim 1 wherein said connecting means includes a connecting member having forward and rearward end portions, said forward end portion of said connecting member being pivotally attached to said rack adjacent its lower end portion, said rearward end portion of said connecting member being pivotally attached to one said assembly spaced rearwardly of its said forward end portion.

3. In the hand truck as defined in claim 1 wherein said connecting means includes a connecting member having forward and rearward end portions, said forward end portion of said connecting member being pivotally attached to said rack adjacent its lower end portion, said rearward end portion of said connecting member being pivotally attached to said base assembly spaced rearward of its said forward end portion.

4. In the hand truck as defined in claim 1 further comprising lifting means extending between and attached to said framework assembly and said connecting means whereby said rack may be generally vertically raised and lowered.

5. In the hand truck as defined in claim 1 further comprising adjustable means attached to said framework assembly for changing the angle of support between the general plane of said rack and said framework assembly when said rack is in its rearward transporting position.

6. In the hand truck as defined in claim 4 wherein said lifting means includes a screw member having upper and lower end portion, a screw member housing having upper and lower end portions, said screw member and housing extending between said framework assembly and said connecting means, means for pivotally connecting said lower end portion of said screw member to said connecting means, said upper end portion of said housing being retained above said base assembly by said framework assembly.

7. In the hand truck as defined in claim 1 further comprising hook means attached to said receiving rack adjacent said lower end portion thereof, said hook means being movable into its operable position spaced from and forward of the general plane of said rack to retain the lower edge portions of materials placed on said supporting lip of said rack.

8. In the hand truck as defined in claim 1 further comprising restraining means extending between and connected to said receiving rack and said framework assembly, said restraining means limiting the forward pivotal movement of said rack to a position in which said lip is generally parallel to the surface area.

9. In the hand truck as defined in claim 1 further comprising shock absorbing means extending between and pivotally attached at each end to respective said rack and one said assembly spaced rearwardly of its said forward end portion, said shock absorbing means cushioning and absorbing the shock of the load on said framework assembly when tilting the loaded said rack from its forward position to its rearward position in contact with said framework assembly.

10. In the hand truck as defined in claim 1 further comprising shock absorbing means extending between and pivotally attached at each end to respective said rack and said base assembly spaced rearward of its said forward end portion, said shock absorbing means cushioning and absorbing the shock of the load on said framework assembly when tilting the loaded said rack from its forward position to its rearward position in contact with said framework assembly.

11. In the hand truck as defined in claim 1 wherein said framework assembly includes four elongated members having lower end portions attached to said base assembly and extending upward therefrom in a generally pyramidal shape and joined at their upper end portions, two of said members being attached to said forward end portion of said base assembly and two of said members being attached to said rearward end portion of said base assembly, said two members attached to said forward end portion extending upward from said generally horizontal base assembly at an angle of generally 45° to provide an angled support for said rack.

12. In the hand truck as defined in claim 1 further comprising selectively adjustable hook means attached to said receiving rack and extending thereabove, said hook means being movable into its operable position spaced from and forward of the general plane of said rack to retain the upper edge portions of various heights of materials placed on said rack, said hook means including a member spaced rearwardly from and generally parallel to the general plane of said rack, said member providing an additional support for the upper edge portions of materials which extend above said rack.

13. A hand truck for lifting and transporting flat rectangular materials of relatively large length and width and relatively small thickness and stacks thereof, comprising a generally horizontal base assembly having forward and rearward end portions, said base assembly being generally rectangular in shape and having a member on each of three sides and one open side partially defining said forward end portion, said base assembly including a castor mounted to each of its corner portions to permit said base assembly to be generally movable over a surface area, a pyramidal shaped framework assembly attached to the corner portions of said base assembly and extending upward therefrom to form a vertex thereabove, a handle attached to the upper portion of said framework assembly for controlling and moving the truck on the surface area, a generally upright receiving rack having upper and lower end portions and including a supporting lip fixedly positioned adjacent its lower end portion, said lip extending generally perpendicular to the general plane of said rack, and connecting means pivotally attaching said rack to said base assembly with the general plane of said rack extending laterally of the normal rolling movement of said base assembly, said rack being pivotal on said connecting means from a rearward transporting position in contact with said framework assembly to a forward loading and unloading position in which said lip is generally parallel and closely adjacent to the surface area.

14. The hand truck as defined in claim 13 wherein said connecting means includes a connecting member having forward and rearward end portions, said forward end portion of said connecting member being positioned adjacent said forward end portion of said base assembly, said forward end portion of said connecting member being pivotally attached to said rack adjacent its lower end portion, said rearward end portion of said connecting member being pivotally attached to said base assembly spaced rearwardly of its said forward end portion.

15. The hand truck as defined in claim 13 further comprising lifting means extending between and attached to said framework assembly and said connecting means whereby said rack may be generally vertically raised and lowered.

16. The hand truck as defined in claim 15 wherein said lifting means includes a screw member having upper and lower end portions, a screw member housing having upper and lower end portions, said screw member and housing extending between said framework assembly and said connecting means, means for pivotally connecting said lower end portion of said screw member to said connecting means, said upper end portion of said housing being retained above said base assembly by said framework assembly.

17. The hand truck as defined in claim 13 further comprising adjustable means attached to the upper portion of said framework assembly for changing the angle of support between the general plane of said rack and said framework assembly when said rack is in its rearward transporting position.

18. The hand truck as defined in claim 13 further comprising hook means attached to said receiving rack adjacent said lower end portion thereof, said hook means being movable into its operable position spaced from and forward of the general plane of said rack to retain the lower edge portion of materials placed on said supporting lip of said rack.

19. The hand truck as defined in claim 13 further comprising restraining means extending between and connected to said receiving rack and said framework assembly, said restraining means limiting the forward pivotal movement of said rack to a position in which said lip is generally parallel to the surface area.

20. The hand truck as defined in claim 13 further comprising shock absorbing means extending between and pivotally attached at each end to respective said rack and said base assembly spaced rearwardly of its said forward end portion, said shock absorbing means cushioning and absorbing the shock of the load on said framework assembly when tilting the loaded said rack from its forward position to its rearward position in contact with said framework assembly.